United States Patent [19]

Kleinhuber

[11] Patent Number: 4,561,778
[45] Date of Patent: Dec. 31, 1985

[54] APPARATUS FOR MEASURING THE DIMENSIONS OF CYLINDRICAL OBJECTS BY MEANS OF A SCANNING LASER BEAM

[76] Inventor: Harald Kleinhuber, P.O. Box 157, S-152 00 Strangnas, Sweden

[21] Appl. No.: 584,950
[22] PCT Filed: May 26, 1983
[86] PCT No.: PCT/SE83/00209
§ 371 Date: Jan. 3, 1984
§ 102(e) Date: Jan. 3, 1984
[87] PCT Pub. No.: WO83/04303
PCT Pub. Date: Dec. 8, 1983

[30] Foreign Application Priority Data

May 28, 1982 [SE] Sweden ................... 8203310

[51] Int. Cl.⁴ ............................................ G01B 11/08
[52] U.S. Cl. .................... 356/387; 350/6.91
[58] Field of Search ............. 356/380, 381, 384–387; 250/560, 571; 350/6.8, 6.91

[56] References Cited

U.S. PATENT DOCUMENTS 4,007,992  2/1977  Petrohilos et al. ................. 356/387
4,381,152  4/1983  Riech et al. ....................... 356/385
4,521,113  6/1985  Kuwabara et al. ................. 356/378

Primary Examiner—R. A. Rosenberger
Attorney, Agent, or Firm—Collard, Roe & Galgano

[57] ABSTRACT

The invention relates to apparatus for measuring the dimensions of cylindrical objects by means of a scanning laser beam which is directed from a source (1) of laser light onto a rotating mirror (2) and through a first lens (6) located a focal-length distance from the center of rotation of the mirror. The beam is arranged to sweep over one side of the object (7) and is reflected onto the rotating mirror from where it is reflected onto a light detector (11) arranged to control a data processor (12), which determines and indicates the sensed dimension. The apparatus includes means (2,10,9,8) for directing the laser beam onto and to sweep the same over the other, opposite side of the object (7). During one revolution of the mirror the beam will therewith, during one half of a mirror revolution, sweep over a first side of the object, and will sweep over the other side of the object during the other half of the mirror revolution. The data processor formulates the mean value of the measuring values sensed on the one and the other side of the object, thereby substantially eliminating measuring errors.

1 Claim, 1 Drawing Figure

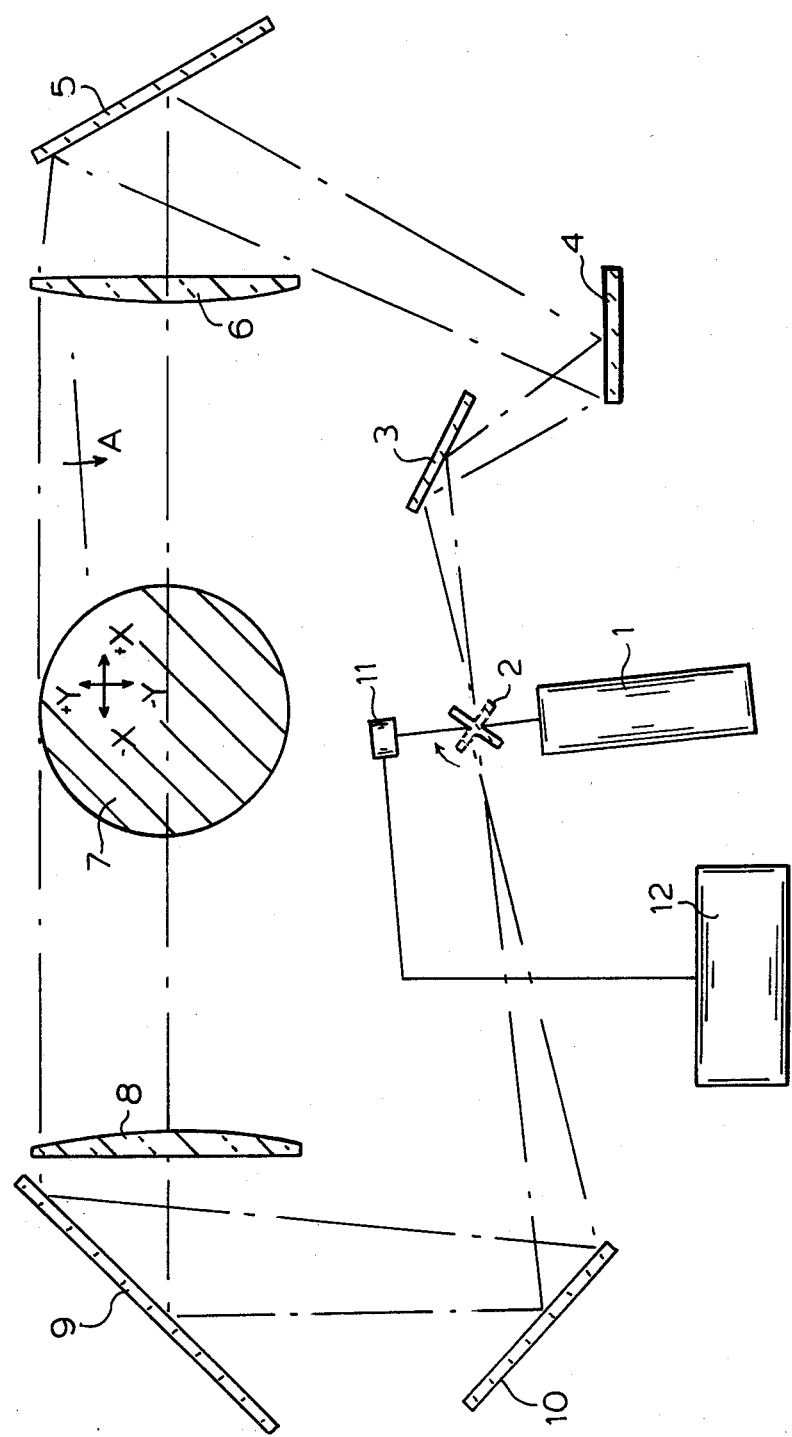

APPARATUS FOR MEASURING THE DIMENSIONS OF CYLINDRICAL OBJECTS BY MEANS OF A SCANNING LASER BEAM

The present invention relates to apparatus for measuring the dimensions of cylindrical objects, by means of a scanning laser beam.

Apparatus for measuring the diameter of cylindrical objects, such as axles, tubing, piping and the like are known to the art. The objects are measured with the aid of a laser beam, which co-acts with a rotating mirror or prism. A lens sights the beam, the beam is sighted onto the objects by means of a lens, such, that said beam sweeps over the object being measured in mutually parallel paths.

An apparatus for measuring the dimensions of an object with the aid of a laser beam is described in Swedish Published Patent Application No. 7812400-5 (Publication No. 414,225). In this apparatus the beam is directed from a light source onto a rotating mirror, from where it passes through a lens located a focal-length distance from the centre of rotation of the mirror, and impinges upon an object to be measured, from where the beam is reflected against said mirror to a light detector. Arranged to rotate with the mirror is a pulse-emitter which, together with the light detector, controls a data processor, which determines the sensed dimension of the object.

The problem associated with known measuring apparatus of this kind is that horizontal and vertical displacement of the object to be measured always results in measuring errors. Calibration of the measuring apparatus is namely only applicable for a certain given position of the object being measured. The measuring error caused by displacement of said object on one direction (the Y-direction) can be eliminated by also measuring the position of the object in this direction and by using this information to correct the measurement value with the aid of a suitable microprogram. On the other hand, it is not possibly by means of the measuring apparatus to register movement of the object to be measured in a direction (X-direction) perpendicular to the first mentioned direction.

The beam transmitted by the measuring apparatus shall move with rotation of the mirror, so that the beam constantly lies parallel with the object axis of the system. This is difficult to achieve, however, because all objectives having spherical surfaces exhibit lens errors, which result in measuring errors. It is possible to eliminate such errors, by using lenses having aspherical surfaces, or by using lens combinations which are finally corrected against spherical aberration. Such objectives having large apertures are extremely difficult to manufacture, however, and are also extremely expensive.

The object of the present invention is to eliminate the aforedescribed difficulties.

This is achieved by means of an apparatus for measuring the dimensions of cylindrical objects with the aid of a scanning laser beam, which is directed from a source of laser light onto a rotating mirror and through a first lens located a focal-length distance from the centre of rotation of the mirror, the beam being arranged to sweep over one side of the object and to be reflected by the rotating mirror to a light detector arranged to control a data processor which determines and indicates the sensed dimension, the apparatus being mainly characterized by means arranged to direct the beam towards and to sweep over the other, opposite side of said object alternating with the sweep over said first side of said object, the data processor being arranged to formulate the mean value of the measuring values sensed on said first and said second side of the object, and in that the mirror is reflective on both sides thereof and the laser beam, during one half of a revolution of said mirror is arranged to be directed by said mirror through a first system of fixed mirrors onto said first lens so as to sweep across one side of the object; in that the beam is arranged to be directed towards the detector via a second lens which is located on the opposite side of the object to be measured and a second system of fixed mirrors via the rotating mirror; and in that the beam during the subsequent half revolution of the rotating mirror is directed onto the other side of the object via said second system of fixed mirrors and said second lens, the beam being directed onto the detectors via the first lens and said first system via the rotating mirror.

The present invention will now be described in more detail with reference to an exemplary embodiment of measuring apparatus according to the invention illustrated schematically in the accompanying drawing.

The drawing is a top elevational schematical view of the apparatus according to the invention.

Illustrated in the drawing is a laser 1 arranged to transmit a laser beam onto a rotatable mirror 2, which is reflective on both sides thereof. The scanning beam reflected by the mirror 2 is deflected by a series of fixed mirrors 3,4 and 5 onto a lens 6. The lens 6 is arranged to cause the beam to scan an object 7 to be measured in mutually parallel paths. Due to the spherical aberration of the lens, the beam will not scan in precisely parallel directions, and hence the beam will be deflected slightly in the direction indicated by A in the drawing.

Drawn on the object to be measured is a coordinate system XY. When the object 7 is moved in the direction $-X$ the measurement value will be too small, while when the object is moved in the direction $+X$, the measurement value will be too large. The measurement error only occurs in one zone of the measuring area. One prerequisite is that the center of rotation of the mirror be located a focal length distance from the lens.

That light which passes to one side of the object 7 is collected by a lens 8 located opposite the lens 6, and is directed onto mirrors 9,10 and onto a photo detector 11 located adjacent to the rotating mirror 2 via the opposite or backside of the mirror.

The photo detector 11 is arranged, in a known manner, to control a data processor 12, for example analogously with what is described in the aforementioned Swedish Published Specification, and hence this part of the apparatus is not shown in detail on the drawing.

As beforementioned, the mirror 2 is reflective on both sides and the rotary movement of the mirror causes the beam which impinges on the photo detector to be stationary.

When the mirror 2 is rotated through 90° in the direction of the arrow shown, the beam generated by the laser 1 will be reflected onto the mirrors 10 and 9 and through the lens 8, from where it is directed onto the object 7 to be measured. The lenses 8 and 6 are mutually similar. On the other hand, the lens 6 receives the light and directs it through the mirrors 5,4,3 onto the opposite side of the rotating mirror 2, which reflects it onto the photo detector 11.

Those measuring errors which occur when the object is moved in the X-direction, when measuring from the right and from the left obtain opposite magnitudes and can therefore be eliminated by producing mean values.

As will be understood from the description of the invention, the object to be measured is scanned by the laser beam from two different directions, and the error is eliminated by formulating a mean value in the data processor.

It will be understood that the schematically illustrated data processor 12 is intended to represent synchronizing means, pulse-generating and pulse-receiving means, indicating means and pulse-counting means, for example in the manner described in the aforementioned Swedish Published Specification No. 7812400-5.

I claim:

1. An apparatus for measuring the dimensions of cylindrical objects with the aid of a scanning laser beam, which is directed from a source (1) of laser light onto a rotating mirror (2) and through a first lens (6) located a focal-length distance from the centre of rotation of the mirror, the beam being arranged to sweep over one side of the object (7) and the laser light which passes the sides of said object is reflected onto the rotating mirror and to a light detector (11) arranged to control a data processor (12) which determines and indicates the sensed dimension, the apparatus being mainly characterized by means (2,10,9,8) arranged to cause the beam to be directed towards and to sweep over the other, opposite side of said object (7) alternating with the sweep over said first side of said object, the data processor being arranged to formulate the mean value of the measuring values sensed on said first and said second side of the object; in that the mirror (2) is reflective on both sides thereof and the laser beam, during one half of a revolution of said mirror is arranged to be directed by said mirror through a first system of fixed mirrors (3, 4,5) onto said first lens (6) so as to sweep across one side of the object (7); in that the beam is arranged to be directed towards the detector via a second lens (8) which is located on the opposite side of the object (7) to be measured and a second system of fixed mirrors (9, 10) via the rotating mirror (2); and in that the beam during the subsequent half revolution of the rotating mirror (2) is directed onto the other side of the object (7) via said second system of fixed mirrors (10,9) and said second lens (8), the beam being directed onto the detector (11) via the first lens (6) and said first system (5,6,4) via the rotating mirror (2).

* * * * *